United States Patent
Yamaguchi

(10) Patent No.: US 12,270,092 B2
(45) Date of Patent: Apr. 8, 2025

(54) FERRITIC SPHEROIDAL GRAPHITE CAST IRON, DIFFERENTIAL CASE, AND DIFFERENTIAL DEVICE

(71) Applicant: AISIN TAKAOKA CO., LTD., Toyota (JP)

(72) Inventor: Tomohiro Yamaguchi, Toyota (JP)

(73) Assignee: AISIN TAKAOKA CO., LTD., Toyota (JP)

( * ) Notice: Subject to any disclaimer, the term of this patent is extended or adjusted under 35 U.S.C. 154(b) by 139 days.

(21) Appl. No.: 17/913,090

(22) PCT Filed: Mar. 22, 2021

(86) PCT No.: PCT/JP2021/011687
§ 371 (c)(1),
(2) Date: Sep. 20, 2022

(87) PCT Pub. No.: WO2021/193523
PCT Pub. Date: Sep. 30, 2021

(65) Prior Publication Data
US 2023/0160044 A1 May 25, 2023

(30) Foreign Application Priority Data
Mar. 23, 2020 (JP) .................. 2020-051562

(51) Int. Cl.
| | |
|---|---|
| C22C 37/04 | (2006.01) |
| C22C 33/08 | (2006.01) |
| C22C 33/10 | (2006.01) |
| C22C 37/10 | (2006.01) |
| F16H 48/38 | (2012.01) |

(Continued)

(52) U.S. Cl.
CPC .............. *C22C 37/04* (2013.01); *C22C 33/08* (2013.01); *C22C 33/10* (2013.01); *C22C 37/10* (2013.01); *F16H 48/40* (2013.01); *F16H 2048/385* (2013.01); *F16H 57/032* (2013.01)

(58) Field of Classification Search
CPC .... C22C 37/04; F16H 2048/385; F16H 48/40
See application file for complete search history.

(56) References Cited

U.S. PATENT DOCUMENTS

| | | | |
|---|---|---|---|
| 4,800,949 A | 1/1989 | Bak et al. | |
| 6,066,063 A * | 5/2000 | Ishikawa | F16H 48/22 475/234 |

(Continued)

FOREIGN PATENT DOCUMENTS

| | | | |
|---|---|---|---|
| CN | 110983171 A | 4/2020 | |
| JP | S50124817 A | 10/1975 | |

(Continued)

OTHER PUBLICATIONS

Search Machine Translation Text of JP 2011047420 (Year: 2024).*
(Continued)

*Primary Examiner* — Alexandra M Moore
(74) *Attorney, Agent, or Firm* — BUCHANAN INGERSOLL & ROONEY PC

(57) ABSTRACT

This ferritic spheroidal graphite cast iron contains 3.0% to 3.6% by mass of C, 4.0% to 5.0% by mass of Si, 0.020% to 0.10% by mass of Mg, 1.0% or less of Mn, 0.10% by mass or less of P, and 0.015% by mass or less of S, with the balance being Fe and inevitable impurities.

8 Claims, 3 Drawing Sheets

(51) Int. Cl.
  *F16H 48/40* (2012.01)
  *F16H 57/032* (2012.01)

(56) References Cited

U.S. PATENT DOCUMENTS

| | | | | |
|---|---|---|---|---|
| 8,858,736 | B2 * | 10/2014 | Larker | ............... E02F 3/3677 |
| | | | | 148/322 |
| 2004/0091383 | A1 * | 5/2004 | Suzuki | ............... C22C 37/10 |
| | | | | 420/27 |
| 2016/0252174 | A1 | 9/2016 | Zhang et al. | |
| 2019/0105730 | A1 | 4/2019 | Shimizu et al. | |
| 2020/0131606 | A1 * | 4/2020 | Li | ............... C22C 37/08 |

FOREIGN PATENT DOCUMENTS

| | | | | |
|---|---|---|---|---|
| JP | S6372850 | A | | 4/1988 |
| JP | H02166257 | A | | 6/1990 |
| JP | 2000063977 | A | | 2/2000 |
| JP | 2008229640 | A | * | 10/2008 |
| JP | 2011047420 | A | * | 3/2011 |
| JP | 2015083709 | A | | 4/2015 |
| JP | 2019042748 | A | | 3/2019 |
| JP | 2019070420 | A | | 5/2019 |

OTHER PUBLICATIONS

Office Action (Notice of Reasons for Refusal) issued on Jan. 23, 2024, in corresponding Japanese Patent Application No. 2020-051562 and English translation of the Office Action. (6 pages).

Umetani et al., "Tensile Strength, Fatigue Strength, and Impact Strength of Solution Strengthened High Silicon Ferritic Ductile Cast Iron", J.JFS, Jan. 25, 2014, vol. 86, No. 1, pp. 36-42 and English machine translation. (12 pages).

International Search Report (PCT/ISA/210) with translation and Written Opinion (PCT/ISA/237) mailed on Jun. 8, 2021, by the Japan Patent Office as the International Searching Authority for International Application No. PCT/JP2021/011687. (11 pages).

Office Action (The First Office Action) issued Jul. 29, 2023, by the State Intellectual Property Office of People's Republic of China in corresponding Chinese Patent Application No. 202180021800.X and an English translation of the Office Action. (25 pages).

Office Action (The Second Office Action) issued on Feb. 28, 2024, in corresponding Chinese Patent Application No. 202180021800.X and English translation of the Office Action. (14 pages).

Notification Concerning Transmittal of the International Preliminary Report on Patentability, Notification of Transmittal of Translation of the International Preliminary Report on Patentability (Forms PCT/IB/326, PCT/IB/338 and PCT/IB/373) and the Written Opinion of the International Searching Authority (Form PCT/ISA/237) issued Oct. 6, 2022, by the International Bureau of WIPO in corresponding International Application No. PCT/JP2021/011687. (11 pages).

Chinese Office Action issued CN Application No. 202180021800.X; Mailed May 25, 2024. 15 Pages (with English Translation).

Office Action (Decision of Refusal) issued on Jun. 25, 2024, in corresponding Japanese Patent Application No. 2020-051562 and English translation of the Office Action. (10 pages).

* cited by examiner

[Figure 1]
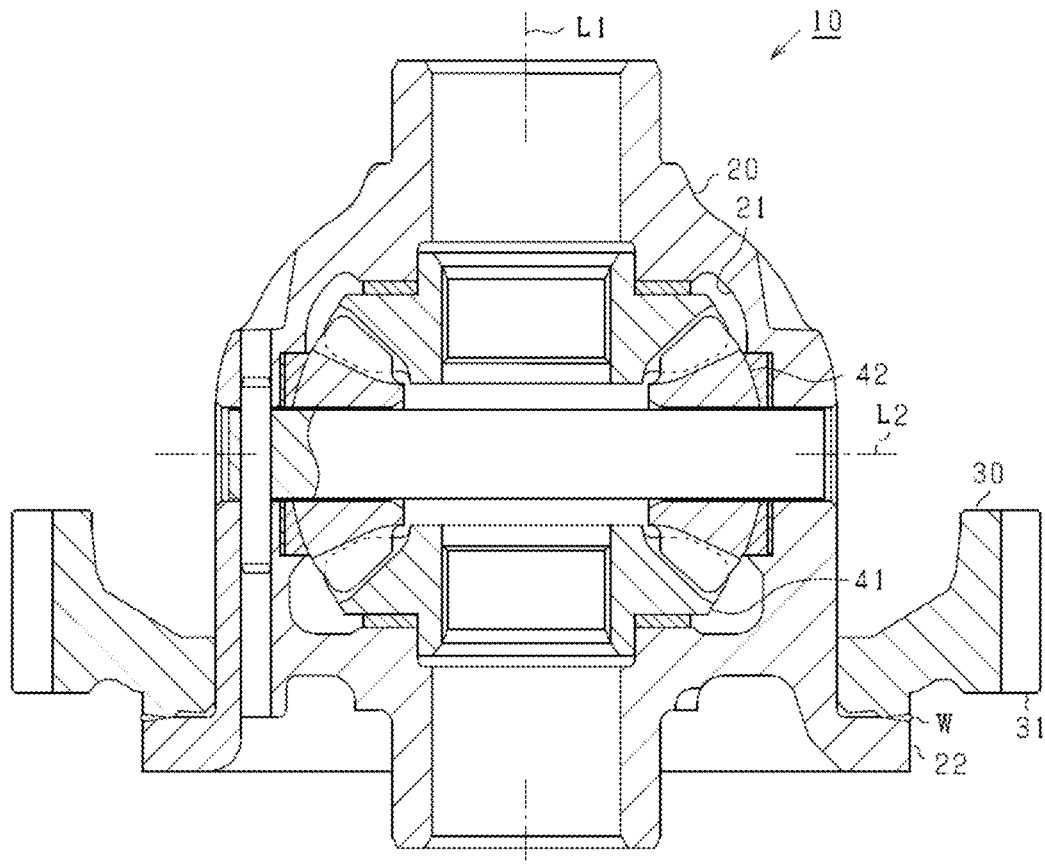
[Figure 2]
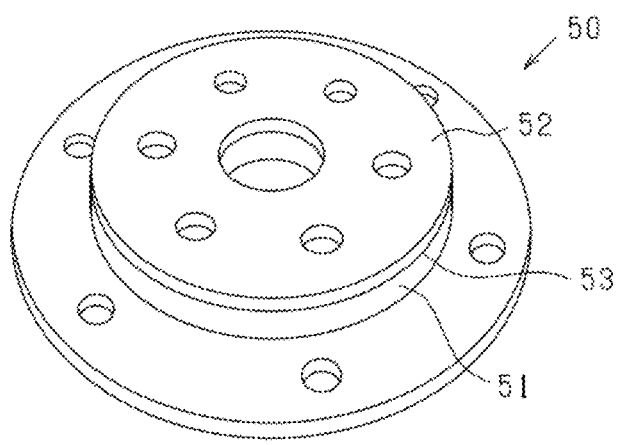

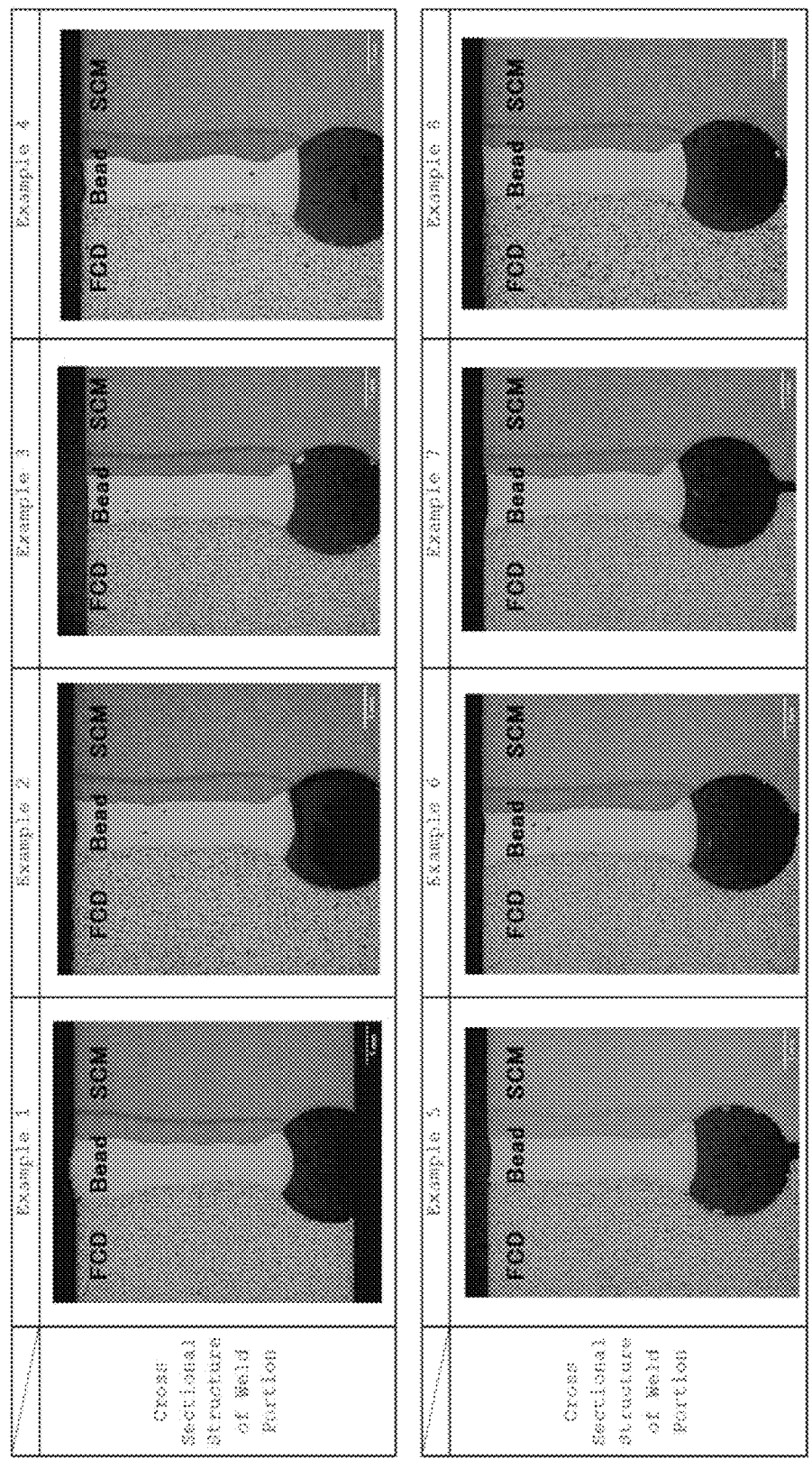
[Figure 3]

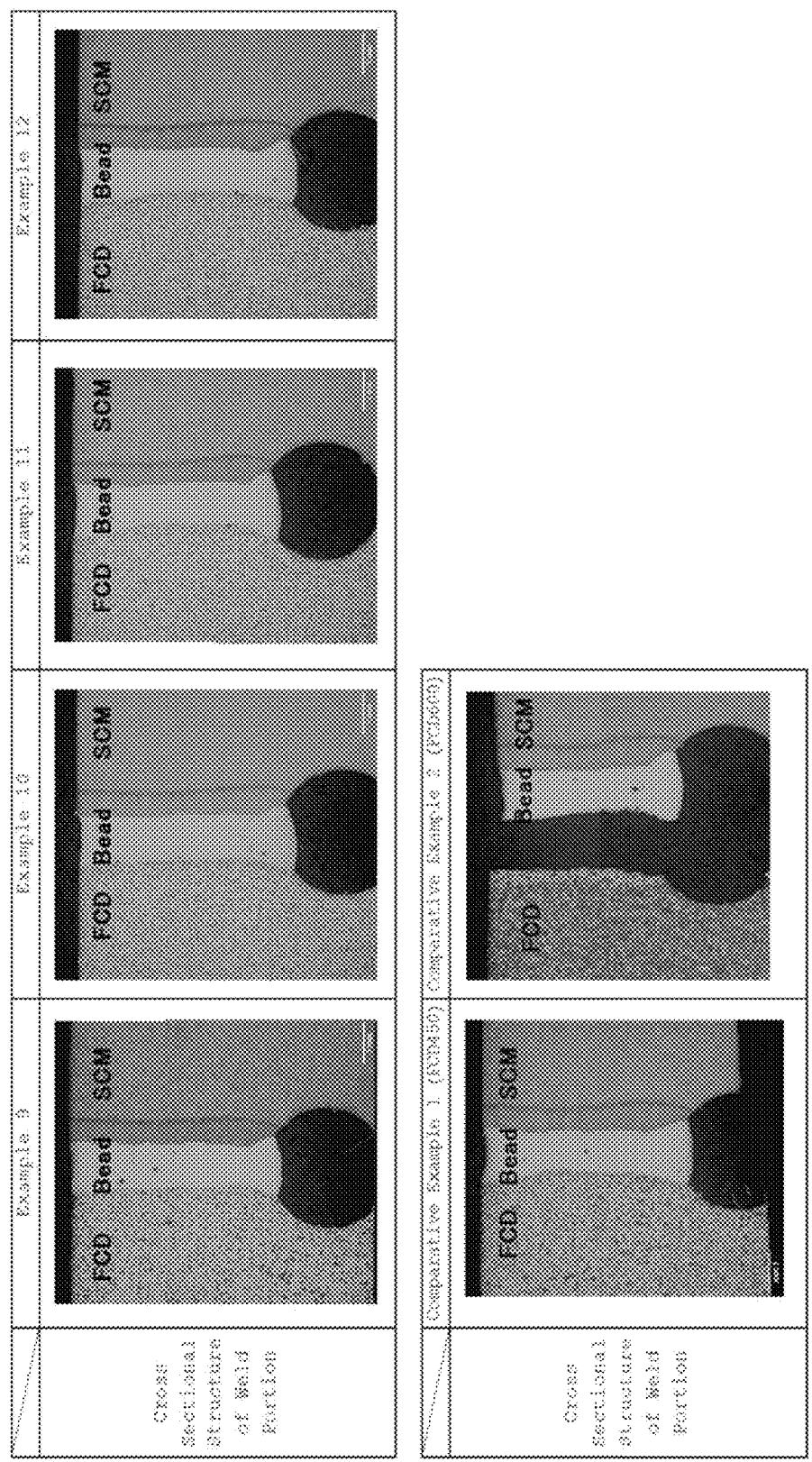
[Figure 4]

FERRITIC SPHEROIDAL GRAPHITE CAST IRON, DIFFERENTIAL CASE, AND DIFFERENTIAL DEVICE

CROSS-REFERENCE TO RELATED APPLICATIONS

This application is based on Japanese Patent Application No. 2020-051562 filed on Mar. 23, 2020, which is hereby incorporated by reference herein.

TECHNICAL FIELD

The present disclosure relates to a ferritic spheroidal graphite cast iron, a differential case, and a differential device.

BACKGROUND ART

Spheroidal graphite cast iron is used in undercarriage parts and engine parts of automobiles and other vehicles because it has great toughness and high mechanical strength and is, in addition, inexpensive and easy to form. For example, vehicles are provided with a differential device to adjust the difference in speed between the left and right wheels that occurs when vehicles turn. The differential case of the differential device is made of spheroidal graphite cast iron.

For the differential device, in recent years, the ring gear and the differential case have been integrated by welding instead of the conventional method of bolting to reduce the weight of the differential device and improve its functionality. However, spheroidal graphite cast iron has poor weldability and is prone to cracking. Accordingly, various techniques have been suggested for improving the weldability of spheroidal graphite cast iron (see, for example, Patent Literatures 1 and 2).

Patent Literature 1 discloses laser welding of cast iron with a metal material weldable to the cast iron in which the weld portion is preheated up to a predetermined temperature before laser welding. Also, Patent Literature 2 discloses that the weldability of spheroidal graphite cast iron is improved by heat-treating pearlite-base spheroidal graphite cast iron to change the base structure of the surface layer of the weld portion into a ferrite layer and allows the internal base structure to be a pearlite layer.

CITATION LIST

Patent Literature

Patent Literature 1: Japanese Patent Laid-Open No. 2019-42748
Patent Literature 2: Japanese Patent Laid-Open No. 2000-63977

SUMMARY OF INVENTION

Technical Problem

Unfortunately, the method described in Patent Literature 1 requires the step of preheating cast iron before laser welding and accordingly may increase manufacturing costs. Also, the method described in Patent Literature 2 requires heat treatment for the product after being cast to change the base structure of the surface layer of the weld portion into a ferrite layer. Accordingly, this method may also increase costs, as with Patent Literature 1. Additionally, in the method described in Patent Literature 2, the mechanical strength of the surface layer is low and is, therefore, unsuitable for applications in which high stresses occur at the surface layer. Particularly when spheroidal graphite cast iron is used as a material for vehicle undercarriage parts such as differential devices, the spheroidal graphite cast iron is required to have high mechanical strength.

The present disclosure is intended to solve the above-described issues, and the main object is to provide a spheroidal graphite cast iron that has high strength and is less likely to crack at the weld portion.

Solution to Problem

The present discloser has studied hard to solve the above issues and found that a spheroidal graphite cast iron with a specific chemical composition can solve the issues. Such findings enabled the present disclosure to be accomplished. Specifically, the present disclosure provides the followings:

[1] A ferritic spheroidal graphite cast iron containing: 3.0% to 3.6% by mass of C; 4.0% to 5.0% by mass of Si; 0.020% to 0.10% by mass of Mg; 1.0% or less of Mn; 0.10% by mass or less of P; and 0.015% by mass or less of S; with the balance being Fe and inevitable impurities.

[2] The ferritic spheroidal graphite cast iron according to the above [1], wherein a mass ratio (Mg/P) of Mg content to P content is 2.1 or less.

[3] A differential case formed of the ferritic spheroidal graphite cast iron according to the above [1] or [2].

[4] A differential device including: the differential case according to the above [3]; and a ring gear, wherein the differential case and the ring gear are welded together.

Advantageous Effects of Invention

According to the present disclosure, a spheroidal graphite cast iron that has high strength and is less likely to crack at the weld portion can be obtained. Additionally, the differential case of the present disclosure is formed of the above-mentioned spheroidal graphite cast iron and accordingly has high strength and superior weldability.

BRIEF DESCRIPTION OF DRAWINGS

The above and other objects, features, and advantages of the present disclosure will become more apparent by the following detailed description with reference to the accompanying drawings.

FIG. 1 is a vertical sectional view illustrating a schematic structure of a differential device.

FIG. 2 is a representation of a weldability evaluation test piece used in Examples and Comparative Examples.

FIG. 3 is a representation of structural photographs for weldability evaluation of Examples 1 to 8.

FIG. 4 is a representation of structural photographs for weldability evaluation of Examples 9 to 12 and Comparative Examples 1 and 2.

DESCRIPTION OF EMBODIMENTS

Details of the present disclosure will now be described below. The spheroidal graphite cast iron of the present disclosure (hereinafter also referred to as "the cast iron disclosed herein") is ferritic spheroidal graphite cast iron containing 3.0% to 3.6% by mass of C, 4.0% to 5.0% by mass of Si, 0.020% to 0.10% by mass of Mg, 1.0% or less of Mn, 0.10% by mass or less of P, and 0.015% by mass or less of S, with the balance being Fe and inevitable impurities. The reasons for the limitation of the chemical composition in the cast iron disclosed herein are as follows.

[Chemical Composition of Spheroidal Graphite Cast Iron]

C (carbon) is an element forming a graphite structure. When the C content is less than 3.0% by mass, the amount of graphite crystalized decreases, and shrinkage cavities are likely to be formed. Also, when the C content exceeds 3.6% by mass, dross (floating graphite) is likely to occur. Preferably, the C content is 3.0% to 3.5% by mass relative to the total mass of the spheroidal graphite cast iron from the viewpoint of reducing the occurrence of casting defects and strengthening the cast iron effectively.

Si (silicon) is an element that increases the amount of ferrite in the base structure of spheroidal graphite cast iron and forms a solid solution with the ferrite to strengthen the base. When the Si content is less than 4.0% by mass, the amount of Si in the solid solution decreases, and the resulting spheroidal graphite cast iron has insufficient tensile strength. Also, when the Si content exceeds 5.0% by mass, the amount of Si in the solid solution increases excessively, and the toughness decreases. Preferably, the Si content is 4.1% to 5.0% by mass, more preferably 4.2% to 4.9% by mass, relative to the total mass of the spheroidal graphite cast iron, from the viewpoint of improving the tensile strength and toughness of the spheroidal graphite cast iron.

C and Si are elements involved in the crystallization of graphite. It is therefore preferable to comprehensively determine the C and Si contents from the carbon equivalent (CE value=(C content (% by mass))+⅓(Si content (% by mass))). The CE value is preferably 4.5 to 5.0.

Mg (magnesium) is an element that affects the spheroidization of graphite. When the Mg content is less than 0.020% by mass, the graphite spheroidization rate decreases, resulting in insufficient toughness and reduced tensile strength and elongation. Also, when the Mg content exceeds 0.10% by mass, cast defects, such as pinholes, are likely to occur. Preferably, the Mg content is 0.025% to 0.10% by mass, more preferably 0.030% to 0.080% by mass, relative to the total mass of the spheroidal graphite cast iron.

Mn (manganese) is an element that promotes pearlitization. Setting the Mn content to 1.0% by mass or less can control the pearlite percentage in the base structure in an appropriate range, thus producing ferrite-dominated spheroidal graphite cast iron. In contrast, a Mn content of more than 1.0% by mass results in reduced toughness. Preferably, the Mn content is 0.95% by mass or less, more preferably 0.010% to 0.90% by mass, relative to the total mass of the spheroidal graphite cast iron.

The cast iron disclosed herein contains 0.10% by mass or less of P (phosphorus). When the P content exceeds 0.10% by mass relative to the total mass of the spheroidal graphite cast iron, steadite (Fe3P) is crystallized, causing weld metal to crack at high temperature. Preferably, the P content is 0.080% by mass or less relative to the total mass of the spheroidal graphite cast iron. Also, the P content is, for example, 0.005% by mass or more relative to the total mass of the spheroidal graphite cast iron.

The cast iron disclosed herein contains 0.015% by mass or less of S (sulfur). When the S content exceeds 0.015% by mass relative to the total mass of the spheroidal graphite cast iron, the graphite spheroidization rate decreases, resulting in reduced toughness. Preferably, the S content is 0.010% by mass or less relative to the total mass of the spheroidal graphite cast iron. Also, the S content is, for example, 0.001% by mass or more relative to the total mass of the spheroidal graphite cast iron.

In the cast iron disclosed herein, the mass ratio (Mg/P) of the Mg content to the P content is preferably 2.1 or less. In ferritic spheroidal graphite cast iron, a medium-temperature embrittlement phenomenon occurs in which the ductility (elongation) decreases at around 400° C. However, adding P and Mg so that the Mg/P is 2.1 or less can reduce the decrease in elongation at around 400° C. The Mg/P is preferably 2.0 or less and is more preferably 1.1 to 2.0.

The cast iron disclosed herein contains the above constituents, with the balance being Fe (iron) and inevitable impurities. In the chemical composition of the spheroidal graphite cast iron, C and S are measured with a C-S meter according to JIS G 1211, and the other constituents are measured by a ICP emission spectrometry method according to the standard specified in JIS 1258:2014.

[Production of Spheroidal Graphite Cast Iron]

The cast iron disclosed herein can be produced according to a known method. An example of the production method will be described. First, raw materials (iron scrap (scrap iron), pig iron, etc.) are fed into a melting furnace and are melted at a predetermined temperature (e.g., 1500° C. to 1600° C.) to prepare molten metal (melting step). In this step, the type and amount of the inoculant are selected so that the cast iron disclosed herein can be produced, and the molten metal before teeming is prepared by performing the known spheroidization and inoculation treatments. Subsequently, the molten metal set at a predetermined teeming temperature is poured into a mold, and the molten metal is cooled (casting step). Then, the casting is removed from the mold (unmolding step). Thus, the casting is obtained as the cast iron disclosed herein. The resulting casting may be subjected as needed to various treatments, such as cutting, to produce cast products with desired shapes.

[Physical Properties of Spheroidal Graphite Cast Iron]

The cast iron disclosed herein is a spheroidal graphite cast iron whose base structure, excluding the graphite structure, is mainly ferrite. In cast iron, the proportion of the ferrite structure in the base structure is expressed using the percentage of the area occupied by the pearlite structure (hereinafter referred to as the "pearlite percentage") relative to the area of the spheroidal graphite cast iron excluding the graphite structure. In this instance, the lower the pearlite percentage, the higher the percentage of the ferrite structure in the base structure.

Specifically, the pearlite percentage in the cast iron disclosed herein is preferably 40% or less, more preferably 20% or less, still more preferably 10% or less, from the viewpoint of producing a highly weldable cast iron that is less likely to crack at the weld portion. The "pearlite percentage" used in the description herein is a value calculated by the following equation (1), where "area of pearlite+ferrite" is the area of the structure excluding graphite, and "area of pearlite" is the area of the structure excluding graphite and ferrite, wherein these areas are obtained by image processing of a structural photograph of a cross section of cast iron taken under an optical microscope. The details of the measuring method of the pearlite percentage follow the operations described in the Examples described later.

$$\text{Pearlite percentage} = [(\text{area of pearlite})/(\text{area of pearlite}+\text{ferrite})] \times 100 \qquad (1)$$

In general, the higher the pearlite percentage in the base structure of spheroidal graphite cast iron, the greater the tensile strength. In contrast, the cast iron disclosed herein has a low pearlite percentage but a high tensile strength. Hence, the cast iron disclosed herein having the above-described composition can produce a cast iron material with high tensile strength despite having a base with a ferrite-dominated metal structure. Specifically, the cast iron disclosed herein has a tensile strength of, for example, 550 N/mm$^2$ or more, preferably 580 N/mm$^2$ or more. The upper limit of the tensile strength of the cast iron disclosed herein is not particularly limited but may be, for example, less than 700 N/mm$^2$. Tensile strength is a value measured in accordance with JIS Z 2241: 2011.

The 0.2% proof stress of the cast iron disclosed herein is, for example, 420 N/mm$^2$ or more, preferably 450 N/mm$^2$ or more. The 0.2% proof stress is a value measured by an offset method in accordance with JIS Z 2241: 2011.

For the hardness of the cast iron disclosed herein, the Vickers hardness (HV20) is, for example, 180 HV20 or more, preferably 200 HV20 or more, from the viewpoint of producing a cast iron material suitable for differential cases of differential devices. The upper limit of the Vickers hardness of the cast iron disclosed herein is not particularly limited and may be, for example, 250 HV20 or less from the viewpoint of improving the machinability. The Vickers hardness is a value measured in accordance with JIS Z 2244: 2009. The details of the measurements of tensile strength, 0.2% proof stress, and Vickers hardness follow the methods described in the Examples described later.

[Differential Case and Differential Device]

The cast iron disclosed herein is suitable as a material of differential cases of differential devices. FIG. 1 depicts an example of the structure of a differential device 10. FIG. 1 shows a cross section, which indicates a rotation axis line L1 of a differential case 20 and a ring gear 30 and a rotation axis line L2 of a pinion gear 42. The differential device 10 of the present embodiment is a device assembled to the drive shaft of a vehicle to allow the left and right drive wheels to rotate at different speeds.

As depicted in FIG. 1, the differential device 10 includes a differential case 20, a ring gear 30, a side gear 41, and a pinion gear 42. The differential case 20 is hollow and is formed by casting using the cast iron disclosed herein. The interior of the differential case 20 serves as a housing chamber 21. The housing chamber 21 houses the side gear 41 and the pinion gear 42. A circular ring-shaped flange portion 22 is formed in an overhanging manner at the lower, outer peripheral portion of the differential case 20. In the differential device 10, the ring gear 30 is mounted on the outer peripheral portion of the flange portion 22. Thus, the differential case 20 and the ring gear 30 are integrated into one body.

The ring gear 30 is in a circular ring shape and provided with a teeth portion 31 over the entire outer periphery thereof. In the present embodiment, the ring gear 30 is defined by a helical gear in which a plurality of teeth defining the teeth portion 31 is formed at a slanted angle to the rotation axis line L1. The ring gear 30 is made of, for example, carbon steel or alloy steel (such as chromium-molybdenum steel (SCM)) to ensure the strength of the teeth portion 31 and the accuracy of tooth meshing. The side gear 41 and the pinion gear 42 are incorporated into the housing chamber 21 of the differential case 20 so as to pair with each other.

In the differential device 10 mounted in a vehicle, the differential case 20 rotates axially with the ring gear 30 on the rotation axis line L1 when power is input to the ring gear 30 from a power source (e.g., an engine). At the same time, power is distributed to the left and right drive shafts through the pinion gear 42 and the side gear 41 while allowing differential rotation. The differential mechanism of the pinion gear 42 and the side gear 41 is well known, and a detailed explanation is omitted here.

The ring gear 30 of such a differential device 10 is joined to the flange portion 22 of the differential case 20 by melt welding. In the present embodiment, the ring gear 30 and the differential case 20 are joined by laser welding, and thus, the ring gear 30 and the differential case 20 are integrated into one body. The welding treatment is performed according to a well-known method. For example, with the flange portion 22 of the differential case 20 in contact with the inner peripheral portion of the ring gear 30, the contact face is continuously irradiated with laser light in the circumferential direction from the outer periphery side. In this instance, a weld portion W is formed on the differential device 10 over the entire round of the contact portion of the inner peripheral portion of the ring gear 30 with the outer peripheral portion of the differential case 20.

The method for welding the ring gear 30 to the differential case 20 is not limited to laser welding, and they may be welded by, for example, electron beam welding, arc welding, or the like. The contact face of the flange portion 22 with the inner peripheral portion of the ring gear 30 is not particularly limited and may be in a slanted or stepped shape or any other shape.

Spheroidal graphite cast iron (FCD) is likely to harden at the weld portion W when welded and thus tends to be poor in weldability. According to examinations by the present discloser, it is believed that FCDs with a tensile strength of about 500 MPa of the conventional FCDs used as a material of the differential case 20 are relatively less likely to crack at the weld portion W. However, FCDs with a tensile strength of about 500 MPa are poor in mechanical strength as a material of the differential case 20.

For FCDs having a relatively high perlite percentage in the base and a tensile strength of 550 MPa or more of the conventional FCDs used as a material of the differential case 20, the present discloser has found through his studies that such FCDs are superior in mechanical strength but are more likely than FCDs with a tensile strength of about 500 MPa to crack at the weld portion W (more specifically, heat-affected zone (HAZ)) when welded. This may be attributed to the transformation of pearlite in FCD into harder, brittle martensite due to the thermal history during welding, that is, thermal changes during welding in which the cast iron is heated to the A1 transformation point or more and then rapidly cooled.

It is known that chilling progresses at the contact portion with weld metal (weld bead) in the structure of the heat-affected zone of cast iron and the portion where the chilling progresses is likely to crack by hardening. However, the chilling in the heat-affected zone can be reduced by known methods, such as a method using welding wire containing Ni.

Unlike such a cast iron, the cast iron disclosed herein having the above-described chemical composition has a ferrite-dominated base structure and is, therefore, less likely to transform into martensite when welded. Consequently, the weld portion W of this cast iron is less likely to crack even by welding. Also, the cast iron disclosed herein has a high tensile strength that is equivalent to the tensile strength of FCD600 specified in JIS G5502. Thus, the cast iron disclosed herein, which is superior in mechanical strength and weldability, is suitable as a material of the differential case 20 to be integrated with the ring gear 30 into one body by welding.

Additionally, the cast iron disclosed herein is less likely to crack at the weld portion W, and the strength of the weld portion is highly reliable. Accordingly, the test process of the weld portion W with an ultrasonic testing device or the like can be simplified. Furthermore, in the cast iron disclosed herein, since the weldability is improved by the chemical constituents in the base structure, products after casting do not require special heat treatment to improve the weldability of the cast iron. Consequently, the increase in the number of steps of the production line and the increase in production costs can be suppressed.

EXAMPLES

The present disclosure will be further described in detail with reference to Examples, but the disclosure is not limited to the Examples. In Examples and Comparative Examples, "part(s)" and "%" are on a mass basis unless otherwise specified. Chemical constituents and each physical property were measured as below.

[Measurement of Chemical Compositions]: In the measurements of chemical compositions in spheroidal graphite cast iron, C and S were measured with a C-S meter according to JIS G 1211. Constituents other than C and S were measured by an ICP emission spectrometry method according to the standard specified in JIS 1258: 2014.

[Tensile Strength and Elongation]: In accordance with JIS Z 2241: 2011, No. 4 test pieces were prepared, and tensile strength (maximum stress) and elongation (elongation at break) were measured at room temperature using a stress-strain curve.

[0.2% proof stress]: This is measured by an offset method in accordance with JIS Z 2241: 2011.

[Hardness]: Vickers hardness was measured at a test force of 196.1 N and at room temperature in accordance with JIS 22244: 2009.

[Pearlite Percentage]: A cross section of cast iron was photographed under an optical microscope (manufactured by Olympus Corporation) at a magnification of 100 times. The taken structural photograph was image-processed to extract the structure excluding graphite as "area of pearlite +ferrite" and to extract the structure excluding graphite and ferrite as "area of pearlite", and the pearlite percentage (%) was calculated from the above equation (1).

Example 1

1. Production of Spheroidal Graphite Cast Iron

Scrap iron was added to a high-frequency induction melting furnace, and the material was thus melted by heating. An inoculant and a spheroidizing agent were added to the resulting molten metal, and the molten metal was poured into a Y block-shaped mold. Then, after the molten metal was cooled to the shake-out temperature in the mold, the cast iron was removed from the mold. The chemical composition of the resulting spheroidal graphite cast iron is presented in Table 1. It should, however, be noted that the balance, omitted from Table 1, is Fe and inevitable impurities. In Table 1, "-" indicates that the constituent concerned is not contained. In the cast iron of Example 1, the mass ratio (Mg/P) of the Mg content to the P content was 2.0.

2. Evaluation

The tensile strength (MPa), elongation at break (%), 0.2% proof stress (MPa), hardness (HV20), and pearlite percentage (%) of the spheroidal graphite cast iron produced in 1. described above were measured. Evaluation results are presented in Table 2. The spheroidal graphite cast iron of Example 1 had a pearlite percentage of 1% and was of ferrite base.

3. Evaluation of Weldability

An evaluation test piece 50 depicted in FIG. 2 was produced using the spheroidal graphite cast iron produced in 1. described above and steel (SCM420). The evaluation test piece 50 is formed by laying an FCD plate 52 made of the spheroidal graphite cast iron on a circular ring-shaped gear member 51 made of the steel (SCM420). The FCD plate 52 is a circular plate corresponding to the shape of the upper surface of the gear member 51. For the evaluation test piece 50, the contact portion 53 of the gear member 51 with the FCD plate 52 was irradiated with laser light from a side to integrate the gear member 51 and the FCD plate 52 by laser welding. The laser welding was performed under the conditions: laser power of 3.8 kW; welding speed of 1.5 m/min, while using a Ni-containing welding wire. A cross section of the weld portion of the evaluation test piece 50 was photographed under an optical microscope (manufactured by Olympus Corporation) at a magnification of 100 times to evaluate the weldability. A structural photograph of the cross section of the weld portion is shown in FIG. 3. In FIG. 3, "FCD" corresponds to the FCD plate 52 of the evaluation test piece 50, and "SCM" corresponds to the gear member 51. "Bead" represents a welding bead (the same applied to FIG. 4).

Examples 2 to 12

In the same manner as in Example 1, except for replacing the spheroidal graphite cast iron to be used with the spheroidal graphite cast iron containing the chemical constituents presented in Table 1, the tensile strength, elongation at break, 0.2% proof stress, hardness, and pearlite percentage were measured, and the weldability was also evaluated. Evaluation results are presented in Table 2 and FIGS. 3 and 4. The Mg/P ratios of the spheroidal graphite cast irons of Examples 2 to 12 were 2.0, 1.7, 1.2, 1.2, 1.1, 1.1, 1.7, 1.4, 0.95, 1.9, and 1.1, respectively.

Comparative Example 1

In the same manner as in Example 1, except for replacing the spheroidal graphite cast iron to be used with a spheroidal graphite cast iron equivalent to FCD450, containing the chemical constituents presented in Table 1, the tensile strength, elongation at break, 0.2% proof stress, hardness, and pearlite percentage were measured, and the weldability was also evaluated. Evaluation results are presented in Table 2 and FIG. 4. The spheroidal graphite cast iron of Comparative Example 1 had a Mg/P of 2.3.

Comparative Example 2

In the same manner as in Example 1, except for replacing the spheroidal graphite cast iron to be used with a spheroidal graphite cast iron equivalent to FCD600, containing the chemical constituents presented in Table 1, the tensile strength, elongation at break, 0.2% proof stress, hardness, and pearlite percentage were measured, and the weldability was also evaluated. Evaluation results are presented in Table 2 and FIG. 4. The spheroidal graphite cast iron of Comparative Example 2 had a Mg/P of 2.0.

TABLE 1

| | Constituents (mass %) | | | | | | |
|---|---|---|---|---|---|---|---|
| | C | Si | Mn | P | S | Sn | Mg |
| Example 1 | 3.1 | 4.6 | 0.29 | 0.026 | 0.008 | — | 0.052 |
| Example 2 | 3.2 | 4.5 | 0.24 | 0.024 | 0.009 | — | 0.048 |
| Example 3 | 3.1 | 4.6 | 0.79 | 0.026 | 0.008 | — | 0.045 |
| Example 4 | 3.5 | 4.4 | 0.79 | 0.029 | 0.009 | — | 0.036 |
| Example 5 | 3.0 | 4.7 | 0.53 | 0.027 | 0.007 | — | 0.032 |
| Example 6 | 3.4 | 4.5 | 0.87 | 0.029 | 0.006 | — | 0.032 |
| Example 7 | 3.3 | 4.7 | 0.53 | 0.028 | 0.005 | — | 0.032 |
| Example 8 | 3.2 | 4.3 | 0.50 | 0.023 | 0.008 | — | 0.038 |
| Example 9 | 3.5 | 4.4 | 0.50 | 0.028 | 0.008 | — | 0.040 |
| Example 10 | 3.4 | 4.5 | 0.27 | 0.055 | 0.008 | — | 0.052 |
| Example 11 | 3.3 | 4.5 | 0.53 | 0.027 | 0.006 | — | 0.051 |
| Example 12 | 3.4 | 4.7 | 0.52 | 0.046 | 0.006 | — | 0.051 |
| Comparative Example 1 (FCD450) | 3.8 | 2.8 | 0.26 | 0.020 | 0.008 | — | 0.045 |
| Comparative Example 2 (FCD600) | 3.7 | 2.7 | 0.77 | 0.024 | 0.017 | 0.10 | 0.048 |

TABLE 2

| | Tensile Properties | | | Hardness HV 20 | Pearlite Percentage (%) |
|---|---|---|---|---|---|
| | Tensile Strength (MPa) | 0.2% Proof Stress (MPa) | Elongation (%) | | |
| Example 1 | 647 | 528 | 13 | 222 | 1 |
| Example 2 | 598 | 495 | 18 | 213 | 3 |
| Example 3 | 628 | 532 | 4 | 226 | 8 |
| Example 4 | 623 | 508 | 9 | 220 | 6 |
| Example 5 | 651 | 535 | 7 | 234 | 2 |
| Example 6 | 649 | 530 | 6 | 231 | 7 |
| Example 7 | 652 | 537 | 8 | 235 | 3 |
| Example 8 | 604 | 490 | 19 | 212 | 5 |
| Example 9 | 617 | 501 | 20 | 220 | 5 |
| Example 10 | 639 | 527 | 19 | 226 | 2 |
| Example 11 | 649 | 528 | 18 | 228 | 3 |
| Example 12 | 662 | 543 | 11 | 233 | 1 |
| Comparative Example 1 (FCD450) | 481 | 333 | 26 | 160 | 6 |
| Comparative Example 2 (FCD600) | 645 | 439 | 8 | 227 | 88 |

In the comparison of the mechanical properties of spheroidal graphite cast iron among Examples 1 to 12 and Comparative Examples 1 and 2, as presented in Table 2, the FCDs of Examples 1 to 12 had a lower or similar pearlite percentage than the FCD (FCD450) of Comparative Example 1, while the tensile strength of the Examples was higher than that of Comparative Example 1 by 110 MPa or more and was as high as that of Comparative Example 2 (FCD600). Also, the FCDs of Examples 1 to 12 exhibited higher or similar 0.2% proof stress and elongation than the FCD of Comparative Example 2 (FCD600). The hardness of the FCDs of Examples 1 to 12 was also similar to that of Comparative Example 2 (FCD600).

For weldability, cracks at the weld portion of the gear member 51 and the FCD plate 52 were not found in Examples 1 to 12 and Comparative Example 1 (FCD450), as shown in FIGS. 3 and 4. In Comparative Example 2 (FCD600), in contrast, the weld portion of the gear member 51 and the FCD plate 52 was cracked.

The above results clearly show that the spheroidal graphite cast iron of the present disclosure is superior in weldability while its mechanical strength is as high as FCD600.

Although the present disclosure has been described according to embodiments, it should be understood that the present disclosure is not limited to the embodiments. The present disclosure encompasses variations within equalized ranges and various modifications. Additionally, various combinations and forms, and other combinations or forms that further include only one element or more elements or are composed of fewer elements are also within the scope and range of spirit of the disclosure.

REFERENCE SIGNS LIST

10: differential device; 20: differential case; 21: housing chamber; 22: flange portion; 30: ring gear; 41: side gear; 42: pinion gear; 50: evaluation test piece; W: weld portion

The invention claimed is:

1. A differential case formed of a ferritic spheroidal graphite cast iron,
   wherein the ferritic spheroidal graphite cast iron comprises 3.0% to 3.6% by mass of C; 4.6% to 5.0% by mass of Si; 0.020% to 0.10% by mass of Mg; 1.0% by mass or less of Mn; 0.10% by mass or less of P; and 0.015% by mass or less of S; with the balance being Fe and inevitable impurities, and
   wherein a pearlite percentage in the ferritic spheroidal graphite cast iron is 10% or less.

2. A differential device comprising: the differential case according to claim 1; and a ring gear,
   wherein the differential case and the ring gear are welded together.

3. The differential device according to claim 2, wherein a mass ratio (Mg/P) of Mg content to P content in the ferritic spheroidal graphite cast iron is 2.1 or less.

4. The differential device according to claim 2, wherein a pearlite percentage in the ferritic spheroidal graphite cast iron is 8% or less.

5. The differential device according to claim 2, wherein a tensile strength of the ferritic spheroidal graphite cast iron measured in accordance with JIS Z 2241: 2011 is 628 N/mm$^2$ or more.

6. The differential case according to claim 1, wherein a mass ratio (Mg/P) of Mg content to P content in the ferritic spheroidal graphite cast iron is 2.1 or less.

7. The differential case according to claim 1, wherein a pearlite percentage in the ferritic spheroidal graphite cast iron is 8% or less.

8. The differential case according to claim 1, wherein a tensile strength of the ferritic spheroidal graphite cast iron measured in accordance with JIS Z 2241: 2011 is 628 N/mm$^2$ or more.

* * * * *